United States Patent [19]

Jacquot et al.

[11] Patent Number: 4,634,570
[45] Date of Patent: Jan. 6, 1987

[54] PROCESS AND DEVICE FOR MEASURING THE LOCAL THERMAL POWER IN A NUCLEAR REACTOR

[75] Inventors: Jean-Paul Jacquot, Paris; Patrick Guillery, Saint Germain en Laye, both of France

[73] Assignee: Scandpower, Inc., Rockville, Md.

[21] Appl. No.: 510,592

[22] Filed: Jul. 5, 1983

[51] Int. Cl.$^4$ ............................................. G21C 17/00
[52] U.S. Cl. ..................................... 376/247; 376/259
[58] Field of Search ................ 376/247, 259; 136/230, 136/232, 233

[56] References Cited

U.S. PATENT DOCUMENTS

| | | | |
|---|---|---|---|
| 4,075,036 | 2/1978 | Lysikov et al. | 136/233 |
| 4,224,461 | 9/1980 | Snyder, Jr. et al. | 136/232 |
| 4,313,792 | 2/1982 | Smith | 376/247 |
| 4,406,011 | 9/1983 | Burns | 376/247 |
| 4,440,717 | 4/1984 | Bevilacqua et al. | 376/247 |

Primary Examiner—Salvatore Cangialosi
Attorney, Agent, or Firm—Eric P. Schellin

[57] ABSTRACT

This device is intended to measure the thermal power released locally in an area of the core of a nuclear reactor and comprises a conduit in the core of the reactor from the outside which contains a body which absorbs gamma radiations located at the measuring area and associated with a measuring thermocouple. A first junction of the thermocouple is placed so that it is brought to a temperature essentially representative of that of the reactor coolant and slightly affected by the gamma flux, and a second junction is placed so that it is brought to a temperature representative of that of the body which absorbs the radiations. The device comprises a supplementary thermocouple which has a first junction located near that of the measuring thermocouple and a second junction brought to a reference temperature. The output signals of the two thermocouples are applied to means which permit an automatic correction of the indications supplied by the measuring thermocouple as a function of the variations of the output signal of the supplementary thermocouple.

6 Claims, 6 Drawing Figures

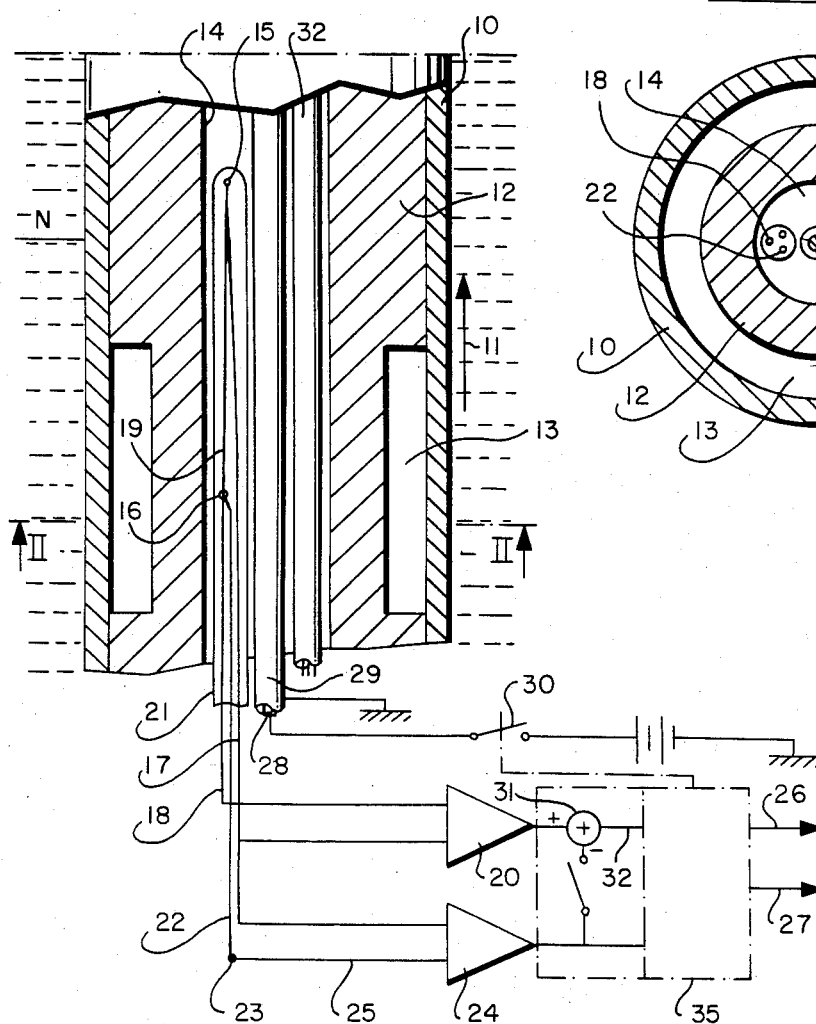
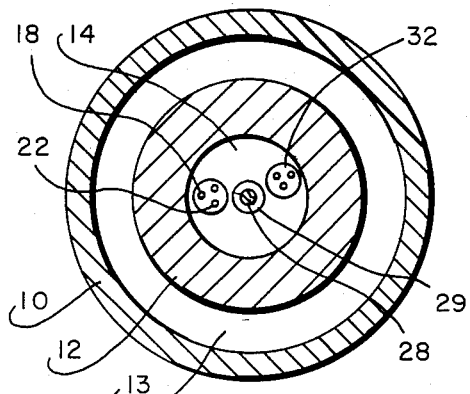
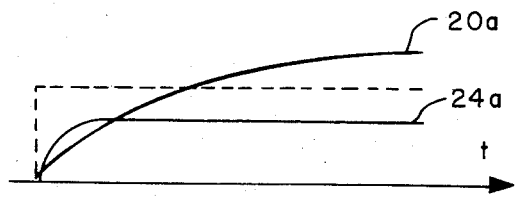

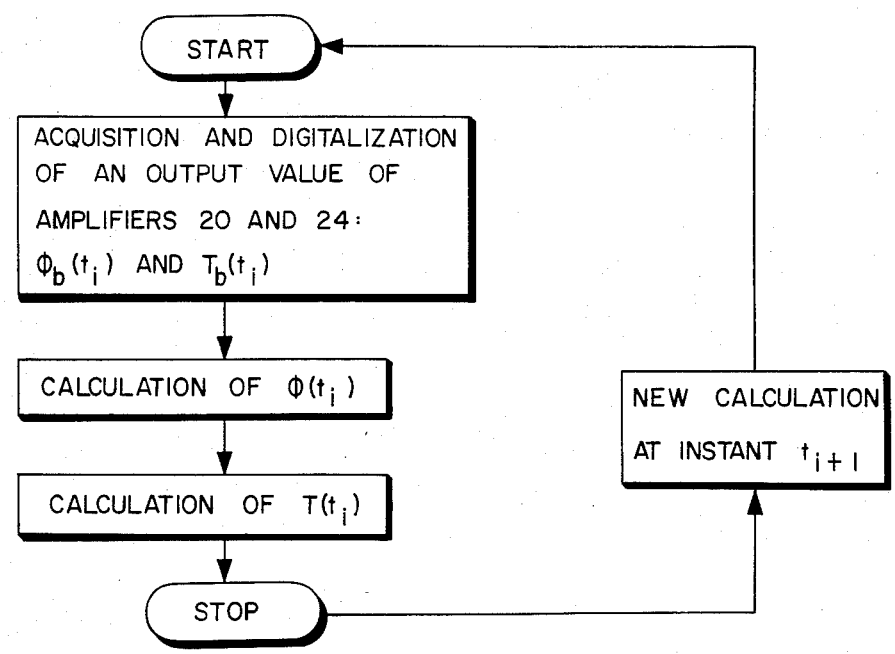
_Fig. 4_
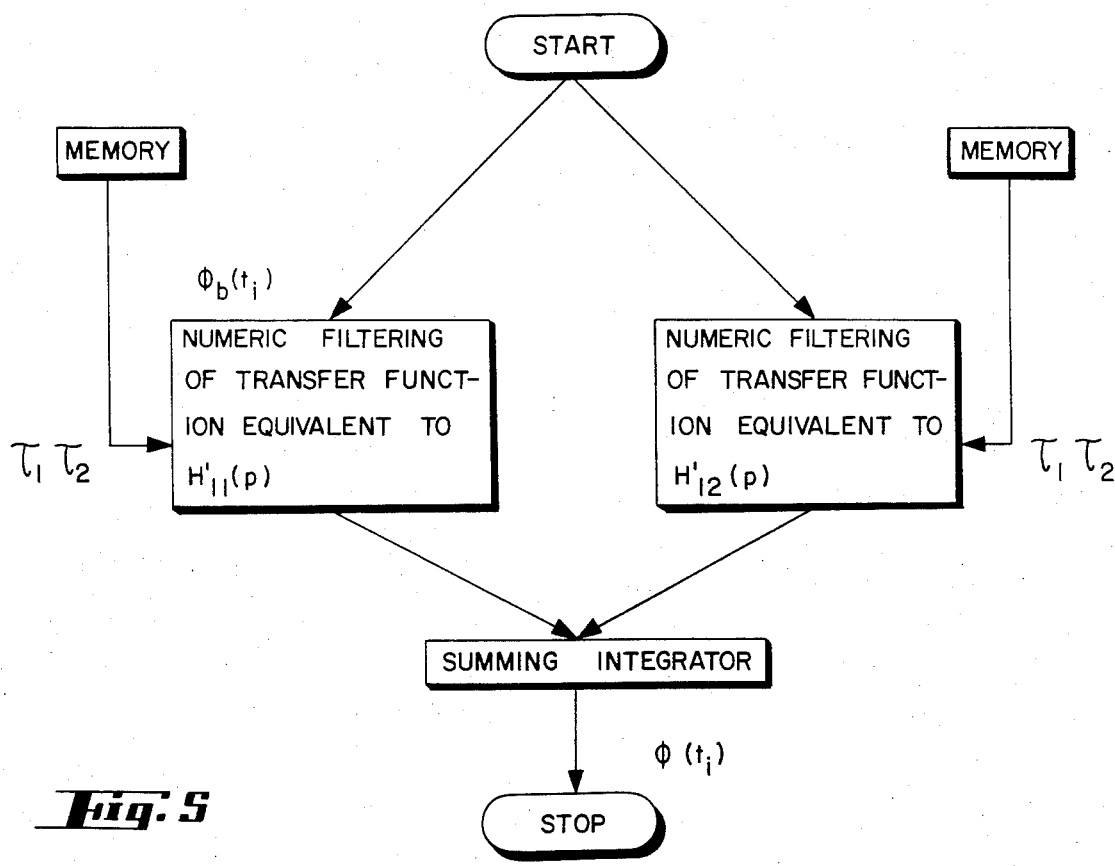
_Fig. 5_

PROCESS AND DEVICE FOR MEASURING THE LOCAL THERMAL POWER IN A NUCLEAR REACTOR

FIELD OF THE INVENTION

This invention relates to measuring the thermal power released locally by the fuel rods in a nuclear reactor. It especially relates to measuring the amount of heat released per unit of length of the rods, which amount varies according to the area of the fuel rod considered and also varies from one fuel rod to the other.

BACKGROUND OF THE INVENTION

A process for measuring the thermal power released locally in an area of the core of a nuclear reactor is already known (French Application No. FR-A-2,420,827). This process measures the voltage at the terminals of a measuring thermocouple with a first junction brought to a reference temperature directly connected to the temperature of the coolant of the reactor at said area during stabilized operation, and a second junction placed so as to be brought to the temperature of a body which absorbs the gamma radiation at said area.

Thus, a measurement is performed by a differential thermocouple subjected to temperature gradients which exist between a mass which absorbs the gamma radiation and is therefore brought to a temperature which depends on the gamma flux and on the local power which is directly connected to it, and a heat source at a temperature which is constant in permanent stabilized operation.

However, during the normal or accidental transitory changes of the operation of the reactor, the temperature of the reference junction develops much more rapidly than the temperature of the hot junction. As a consequence, the output signal obtained comes from the superpositioning of a component representing the gamma flux absorbed and of a transitory component originating in the temperature variations of the reactor coolant.

BRIEF SUMMARY OF THE INVENTION

The present invention has the particular task of eliminating this limitation. To this end, it proposes a process in which there is also a measuring of the electric signal supplied by a supplementary thermocouple with a first junction common with the first junction of the measuring thermocouple and a second junction which is maintained at a reference temperature outside the reactor; the indications supplied by the measuring thermocouples are corrected from those supplied by the supplementary thermocouple during the periods of transitory operation.

The invention also proposes a device for carrying out the process defined above. This measuring device comprises a conduit which penetrates into the reactor core from the outside and contains a body which absorbs gamma radiation located at the measuring area and is associated with a measuring thermocouple whose one first junction is brought to a temperature representative of that of the reactor refrigerant and whose second junction is in thermal contact with the body which absorbs the radiation. This assembly, of the type currently called a "gamma thermometer", is associated with a supplementary thermocouple with a first junction common with that of the measuring thermocouple and with a second junction located outside the reactor and brought to a reference temperature. The output signals of the two thermocouples are applied to means for automatically correcting the indications supplied by the first thermocouple as a function of the variations of the output signal of the second thermocouple.

The two thermocouples can be constructed and connected to the outside in a simple manner by reversing the arrangement described in the special case of a movable gamma thermometer, according to French Application No. FR-A-2,458,878.

The correction means can be analog or numeric. In the second instance, they can comprise in particular a microprocessor. They determine the correction in both instances from the transfer function which connects the error signal to the temperature and to its law of variation.

This transfer function can be determined in situ by providing the device with controlled heating means which are generally constituted by an electric resistor whose dissipated power is communicated to the assembly of junctions. It has already been proposed (French Application No. FR-A-2,470,381) that a gamma thermometer be provided with such heating means, but solely to achieve a calibration in permanent operation. According to the present invention, on the contrary, the heating means associated with the thermocouples not only permit a determination of the sensitivity of the measuring thermocouple in permanent operation, but also a determination of the transfer function of the two thermocouples by modifying the power dissipated by the heating means in a rapid manner and according to a predetermined law, e.g., by applying a power increment (or an excitation of another type: pseudo-random excitation, sinusoidal excitation).

Moreover, providing the device of the invention with controlled heating means makes it possible to separately monitor the common junction and the second junction of the first thermocouple and to detect any accidental variation of characteristic. Finally, it is possible to monitor the thermal transfers between the junction and the environment, thus detecting these variations, which are due, for example, to a drop in the level of the coolant in the reactor.

The invention can be constructed in many embodiments. In particular, the device can comprise in a conduit penetrating into the core and parallel to the fuel rods several measuring assemblies, each of which has a measuring thermocouple and a supplementary thermocouple. The conduit can be constituted by a wall swept on its outside by the coolant and against which the absorbing body, which is tubularly shaped, is placed, except for a zone to the right of which the second junction of the measuring thermocouple is placed.

In another embodiment which is especially advantageous in reactors with pressurized water, the body which absorbs the gamma radiation is swept on its outer surface by the coolant and constitutes the conduit. The first junction is then placed in a zone in which the body wall is locally narrowed.

These and further constructional and operational characteristics of the invention will be more evident from the detailed description given herein after with reference to the figures of the accompanying drawings which illustrate a preferred embodiment and alternatives by way of non-limiting examples.

BRIEF DESCRIPTION OF THE DRAWINGS

FIG. 1 is a basic schema showing the material parts of a device in longitudinal section and the essential elements of the associated electronic circuits.

FIG. 2 is a schematic view in section along line II-II of FIG. 1.

FIGS. 3, 4 and 5 are flow charts indicating the manner of estimation on line of constants of time $\tau_1$ and $\tau_2$, the calculation of the temperatures and true flux, and a subprogram for the calculation of $\phi$ ($t_i$) or T ($t_i$).

FIG. 6 is a graph showing the law of the variation of temperature of the junctions as a function of time (solid curves) in response to the application of a power increment dotted curve).

DESCRIPTION OF THE PREFERRED EMBODIMENT

Figure 3:
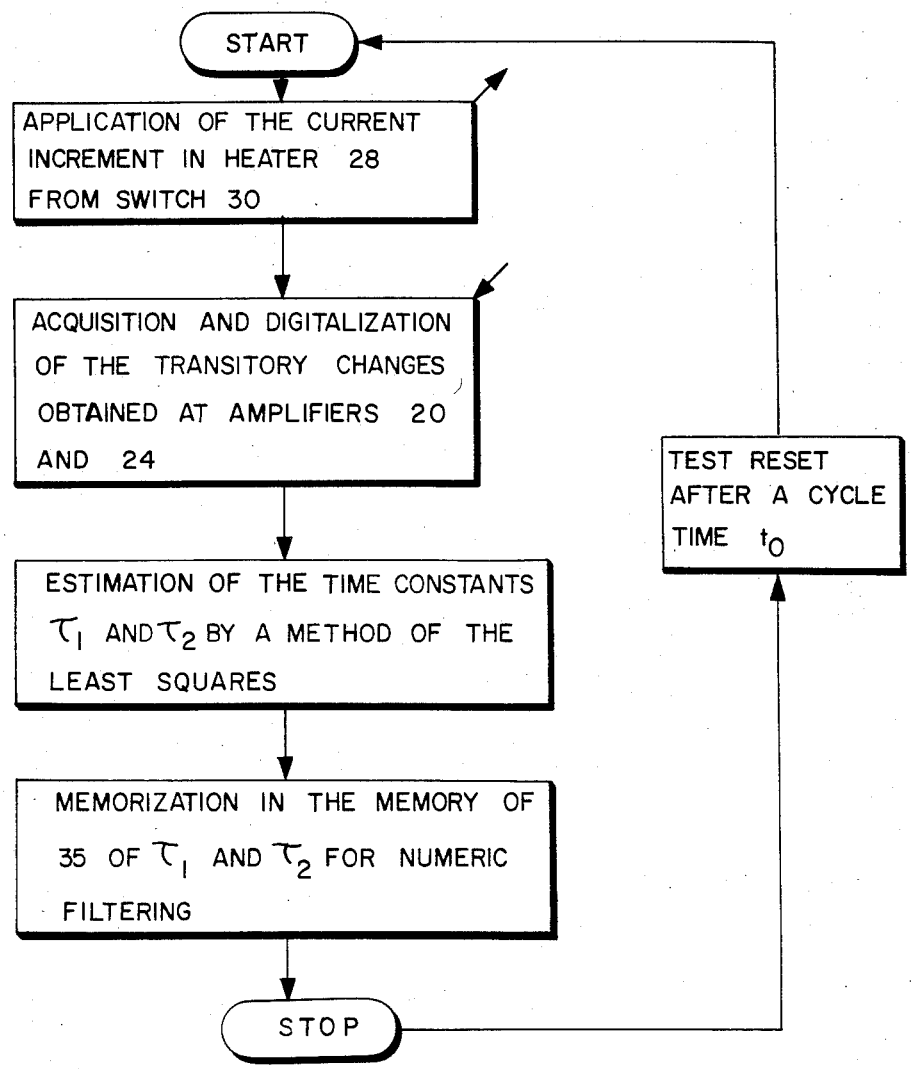

Referring now to the drawings wherein reference numerals are used to designate parts throughout the various figures thereof, there is shown in FIG. 1 and 2, a device which can be used in a reactor with pressurized water, comprising a vertical tube 10, whose outer surface is swept by the circulation 11 of coolant, occupied by elongated cylindrical body 12 made of a material which absorbs gamma radiation (stainless steel, for example). The heat dissipated in cylindrical body 12 by the absorption of gamma radiation flows toward tube 10, whose temperature depends heavily on that of the coolant and to a lesser extent on the gamma flux. The thermal contact between cylindrical body 12 and tube 10 should be good enough not to sustain an appreciable temperature difference between the outer surface of the body and the tube.

FIG. 1 and 2 show an annular recess 13 in body 12 which constitutes a break in the flow path of the heat of body 12 toward tube 10. As a consequence of this break, the thermal flow, which is radial in the greatest part of the length of body 12, is essentially axial in the median part of the narrowed-down region of the body. It is possible, by measuring the temperature difference inside body 12 between an area located in the middle of the narrowed-down part and an area located outside this narrowed-down part, but close to it, to determine the thermal flux flowing toward tube 10 and the power dissipated per unit of length.

The temperature difference is measured by a measuring thermocouple located in central hole 14 of body 12. This thermocouple comprises a first junction (constituting the cold junction) brought to a temperature close to that of the coolant by nevertheless slightly representative of the gamma flux and a second junction which constitutes a hot junction located at the mid-length of the narrowed-down region. These junction can be made as follows: Two insulated wires of a metal constituting a first component of a thermocouple (Chromel, for example) 17 and 18 are run from the outside to junctions 15 and 16. A piece 19 of metal constituting the other component of the thermocouple is connected by welding to wires 17 and 18 and to junctions 15 and 16.

This constitutes a differential thermocouple which can be connected outside the reactor to differential amplifier 20. The junctions and the wires are portected by glove finger 21 filled with a pulverized electric mineral insulation resistant to the radiation in the reactor core.

In addition to this device, the invention comprises a supplementary thermocouple constituted by wire 17 (of Chromel, for example), piece 19 (of alumel, for example) and supplementary output wire 22 constituted by the same material as piece 19. The thermocouple is completed by junction 23 brought to a fixed and known reference temperature. This junction 23 can be located outside the reactor. A second differential amplifier 24 connected to wire 17 and to return wire 25 from junction 23 furnishes an output signal representative of the temperature of junction 15, that is, of the temperature of the coolant of the reactor in stabilized operation and of the gamma flux at the instant considered.

When the operating conditions of the reactor undergo a modification expressed by a rapid transitory change of temperature, the differential thermocouple comprising junctions 15 and 16 furnishes an output signal which carries an error signal. If the transfer function between temperature and error signal is known, this error signal can be calculated and used to correct the gamma measurement. This operation can be performed automatically in a calculating member 35, which comprises, for example, a microprocessor and a read-only memory for storing the transfer function either in the form of a correspondence table or of a calculation program. It is possible in this manner to obtain a signal representative of the gamma flux at output 26.

The calculating member should allow the true temperature T of the coolant and the true gamma flux $\phi$ to be calculated from the signals delivered by amplifiers 20 and 24: raw gamma flux $\phi_b$ and raw coolant temperature $T_b$.

The relations connecting $\phi$, T, $\phi_b$ and $T_b$ are of the form:

$$\begin{pmatrix} \phi_b(p) \\ T_b(p) \end{pmatrix} = \begin{pmatrix} H_{11}(p) & H_{12}(p) \\ H_{21}(p) & H_{22}(p) \end{pmatrix} \begin{pmatrix} \phi(p) \\ T(p) \end{pmatrix} \quad (1)$$

or:

$$\begin{pmatrix} \phi(p) \\ T(p) \end{pmatrix} = \begin{pmatrix} H_{11}(p) & H_{12}(p) \\ H_{21}(p) & H_{22}(p) \end{pmatrix}^{-1} \begin{pmatrix} \phi_b(p) \\ T_b(p) \end{pmatrix} \quad (2)$$

wherein P designates the Laplace operator.

The function $H_{ij}(p)$ are, for example, of the form:

$$H_{11} = K\left[\frac{A_1}{1+\tau_1 p} - \frac{A_2}{1+\tau_2 p}\right]$$

$$H_{12}(p) = \left[\frac{1}{1+\tau_1 p} - \frac{1}{1+\tau_2 p}\right]$$

$$H_{21}(p) = K\frac{A_2}{1+\tau_2 p}$$

$$H_{22}(p) = \frac{1}{1+\tau_2 p}$$

in which $T_1$ and $T_2$ are the time constants of parts 13 and 12.

The matrix equation (2) can also be written in the $$\begin{pmatrix} \phi(p) \\ T(p) \end{pmatrix} = \begin{pmatrix} H'_{11}(p) & H'_{12}(p) \\ H'_{21}(p) & H'_{22}(p) \end{pmatrix} \begin{pmatrix} \phi_b(p) \\ T_b(p) \end{pmatrix}$$

in which the $H'_{ij}(p)$ are calculated from $H_{11}(p)$, $H_{12}(p)$, $H_{21}(p)$ and $H_{22}(p)$.

A possible organization of the calculation is given by the flow charts of FIG. 3, 4 and 5. FIG. 4 gives the general manner of calculating the temperatures and the true flux T and $\phi$ from the raw values $\phi_b$ and $T_b$. FIG. 5 details the subprogram for calculating $\phi$ (the subprogram for calculating T is similar). Finally, FIG. 3 gives a manner of estimating on line the time constants $\tau_1$ and $\tau_2$ which intervene in the calculation of $\phi$ and T.

Calculating member 35 can also be planned to supply a signal representative of the temperature of the refrigerant onto a second output 27.

The determination of the transfer function $H'_{ij}$ can be performed while the device is in place. It is sufficient for this to provide the device with heating means, which are shown in FIG. 1 and 2 as being constituted by electric resistor 28 embedded in a mass of pulverized electrical insulating material and enclosed in protection sheath 29. This resistor is associated with a feed circuit diagrammed in the form of a current source and a switch 30.

Heating resistor 28 permits the sensitivity of the differential thermocouple comprising connectors 15 and 16 to be determined, as has already been disclosed in French application No. FR-A-2,470,381. However, it is also possible to determine the transfer function not only of the differential measuring thermocouple, but also of the supplementary thermocouple. To this end, it is particularly possible to apply a power increment to resistor 28, as is indicated by dashes in FIG. 1. The development of the signals supplied by differential amplifiers 20 and 24 then has the course shown at 20a and 24a in FIG. 6. An analysis of these curves supplies the transfer function of the two thermocouples. It is also possible to obtain a signal at 32 which represents the temperature of the hot weld by making the difference of the signals from amplifiers 20 and 24 in subtractor circuit 31. Finally, if the voltage level is maintained long enough to arrive at a stabilized operation, the sensitivity of the two thermocouples is determined during the same operation.

The device described also permits the variations of the conditions of thermal transfer between body 12 and the environment to be detected, i.e. the reactor coolant. If there is a break-down in operation, resulting in a drop of the free surface of the coolant, lowering it below connector 15 (e.g. to level N in FIG. 1), the region of body 12 located above the refrigerant becomes hot in relation to the region below. As a consequence, the signal supplied by differential amplifier 20 reverses. The sensitivity of such an alarm device in case of a drop of the level of refrigerant can be increased by using heating resistor 28. The difference of temperature between the two connectors 15 and 16 when the refrigerant is at level N is increased by the addition of heat from resistor 28, which is added to the addition of heat by the absorption of gamma radiations. Moreover, measuring the global response time or the time constants $\tau_1$ and $\tau_2$ permits the detection of the fact that level N is below connector 16. Finally, the presence of the supplementary thermocouple also permits the detection of a drop of the free surface of the refrigerant which brings it below the level of junction 16 by two complementary methods: (a) by the amplitude of the heating produced by a heating increment, and (b) by measuring the associated time constant.

All these functions can be simultaneoulsy performed by calculating member 35 which can comprise on the one hand the dynamic filtering member which permits a corrected value of the gamma flux and of the temperature of the coolant to be supplied by calculation from the transfer function, and on the other hand means for automatically determining the sensitivity of the thermocouples and of their transfer function, if required, by controlling at regular intervals the application of a voltage increment, as is schematically indicated at 31 in FIG. 1.

The device can admit of many embodiments. In particular, several assemblied, each of which comprises a measuring thermocouple and a supplementary thermocouple, can be placed in hole 14 so as to perform measurements at different levels. The sheath 32 of such as supplementary assembly is schematically shown in FIG. 1 and 2.

This invention is not limited to the preferred embodiment and alternative embodiments heretofore described, to which variations and improvements may be made, consisting of mechanically and electrically equivalent modifications to component parts, without leaving the scope of protection of the present patent, the characteristics of which are summarized in the following claims.

What is claimed is:

1. A method of measuring the thermal power released locally at a measuring area of the core of a nuclear reactor comprising the steps of:

measuring of the voltage supplied by a measuring thermocouple brought to a reference temperature directly connected to the temperature of the coolant of the reactor at the measuring area during the stabilized operation of the reactor with a second junction placed so as to be brought to the temperature of a body which absorbs the gamma radiation at said area;

measuring simultaneously the voltage supplied by a supplementary thermocouple with a first junction coupled to the second junction of the measuring thermocouple, and provided with a second junction maintained at a reference temperature outside the reactor; and correcting said voltage of said measuring thermocouple by means of the use said voltage from said supplementary thermocouple.

2. A method as in claim 1, where the transfer function of the assembly constituted by said measuring thermocouple and by said absorbing body is determined by analysing their dynamic response to a sharp and determined modification of the power applied to an element for heating the junctions while the reactor is in permanent operation.

3. A method as in claim 2, where the transfer function and the sensitivity of said supplementary thermocouple are determined from the dynamic response of said supplementary thermocouple to a sharp and determined modification of the applied power.

4. A method as in claim 2 or 3, where the sharp variation of the applied power is constituted by the application of an increment of thermal power.

5. A method as in claims 1, 2, 3 or 4, where the output signals of the two thermocouples are analysed to detect the modifications of the conditions of thermal transfer with the reactor coolant due to a drop of the free surface of the coolant.

6. A device for measuring the thermal power locally released at a measuring area of the core of a nuclear reactor comprising:
- a conduit extending into the reactor core from an area outside the reactor, the conduit contains;
- a body which absorbs gamma radiations located at the measuring area; and
- a measuring thermocouple whose first junction is palced so that it is brought to a temperature essentially representative of that of the reactor coolant and slightly affected by the gamma flux, and whose second junction is placed in said body so that it is brought to a temperature representative of that of the body which absorbs the radiations;
- a supplementary thermocouple which has a first junction coupled to the second junction of the measuring thermocouple and a second junction brought to a reference temperature; and
- means which permit an automatic correction of the indications supplied by said measuring thermocouple as a function of the variations of the output signals of said supplementary thermocouple.

* * * * *